(12) United States Patent
Marshall et al.

(10) Patent No.: US 9,436,543 B2
(45) Date of Patent: Sep. 6, 2016

(54) ELECTRONIC DEVICE AND METHOD FOR PROTECTING AN ELECTRONIC DEVICE AGAINST UNAUTHORIZED USE

(75) Inventors: Ray Marshall, Harpenden (GB); Joseph Circello, Phoenix (AZ); Norbert Huemmer, Munich (DE)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/422,060

(22) PCT Filed: Sep. 13, 2012

(86) PCT No.: PCT/IB2012/054758
§ 371 (c)(1),
(2), (4) Date: Feb. 17, 2015

(87) PCT Pub. No.: WO2014/041396
PCT Pub. Date: Mar. 20, 2014

(65) Prior Publication Data
US 2015/0227413 A1     Aug. 13, 2015

(51) Int. Cl.
*G06F 11/07* (2006.01)
*B60R 25/00* (2013.01)
*G06F 21/70* (2013.01)
*G06F 1/04* (2006.01)

(52) U.S. Cl.
CPC .......... *G06F 11/0793* (2013.01); *B60R 25/00* (2013.01); *G06F 1/04* (2013.01); *G06F 11/0721* (2013.01); *G06F 21/70* (2013.01)

(58) Field of Classification Search
None
See application file for complete search history.

(56) References Cited

U.S. PATENT DOCUMENTS

| 5,594,227 A | 1/1997 | Deo |
| 5,699,430 A | 12/1997 | Krizay et al. |
| 6,130,621 A | 10/2000 | Weiss |
| 7,193,481 B2 | 3/2007 | Luzzi |
| 2002/0029347 A1 | 3/2002 | Edelman |
| 2003/0046566 A1 | 3/2003 | Holopainen |
| 2003/0093715 A1* | 5/2003 | Hasako ................. H04N 17/04 714/25 |
| 2006/0176940 A1* | 8/2006 | Chen ..................... G06F 1/08 375/150 |
| 2008/0317185 A1* | 12/2008 | Mueller ............... H03D 3/006 375/376 |
| 2009/0134918 A1 | 5/2009 | Tzeng |
| 2009/0268905 A1* | 10/2009 | Matsushima ........ G06F 21/10 380/200 |

FOREIGN PATENT DOCUMENTS

JP     2004252541 A     9/2004

OTHER PUBLICATIONS

International Search Report and Written Opinion correlating to PCT/IB2012/054758 dated Mar. 27, 2013.

* cited by examiner

*Primary Examiner* — Leon-Viet Nguyen

(57) ABSTRACT

An electronic device comprising a clock unit and a processing unit connected to the clock unit is described. The clock unit may deliver an output clock signal for operating the processing unit in accordance with the output clock signal. The clock unit may have: a normal mode in which the output clock signal has a low amount of jitter and a normal clock rate to enable normal use of the electronic device, and a failure analysis mode in which the output clock signal has a high amount of jitter or a reduced clock rate, or a high amount of jitter combined with a reduced clock rate, to impede the normal use. The clock unit may be protected against unauthorized re-activation of the normal mode. A method of protecting an electronic device against unauthorized use is also described.

13 Claims, 5 Drawing Sheets

ELECTRONIC DEVICE AND METHOD FOR PROTECTING AN ELECTRONIC DEVICE AGAINST UNAUTHORIZED USE

FIELD OF THE INVENTION

This invention relates to an electronic device and a method for protecting an electronic device against unauthorized use.

BACKGROUND OF THE INVENTION

Electronic devices are omnipresent. Examples of electronic devices include, for instance, control devices, e.g., microcontrollers, and digital signal processors. An electronic device may, for instance, be arranged to control an engine in dependence on user input signals in conjunction with sensor signals. The sensor signals may, for instance, indicate current operating characteristics of the engine, such as an instantaneous power, temperature, or a number of revolutions per second.

Although an electronic device may be designed to meet certain minimum requirements in regards to robustness and reliability, the device may fail to operate correctly. This may be due to, for instance, production errors, wear, or aging. Manufactures are increasingly worried about users operating devices which have failed. In the automotive powertrain sector, for instance, a problem exists with illegal tuning or modification of an algorithm that controls an engine, for example, to produce more power or to remove some control restriction. Car manufacturers are therefore concerned about software security and are going to great lengths to close security loopholes. One such loophole is the illegal use of engine control modules that have failed in the field. These failed modules may be sent back to the module manufacturer for failure analysis. A fear is that they may be acquired by illegal tuners, repaired, and resold as a "hot" module. A related concern is that a failed electronic module may get returned to service but containing pirate software. This software may result in the engine not meeting a required emissions standard or overstressing part of the car, such as the gearbox, which may then fail and may have to be replaced under warranty. Another risk is that a failed module is not repaired and then reused by mistake.

SUMMARY OF THE INVENTION

The present invention provides an electronic device and a method for protecting an electronic device against unauthorized use as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
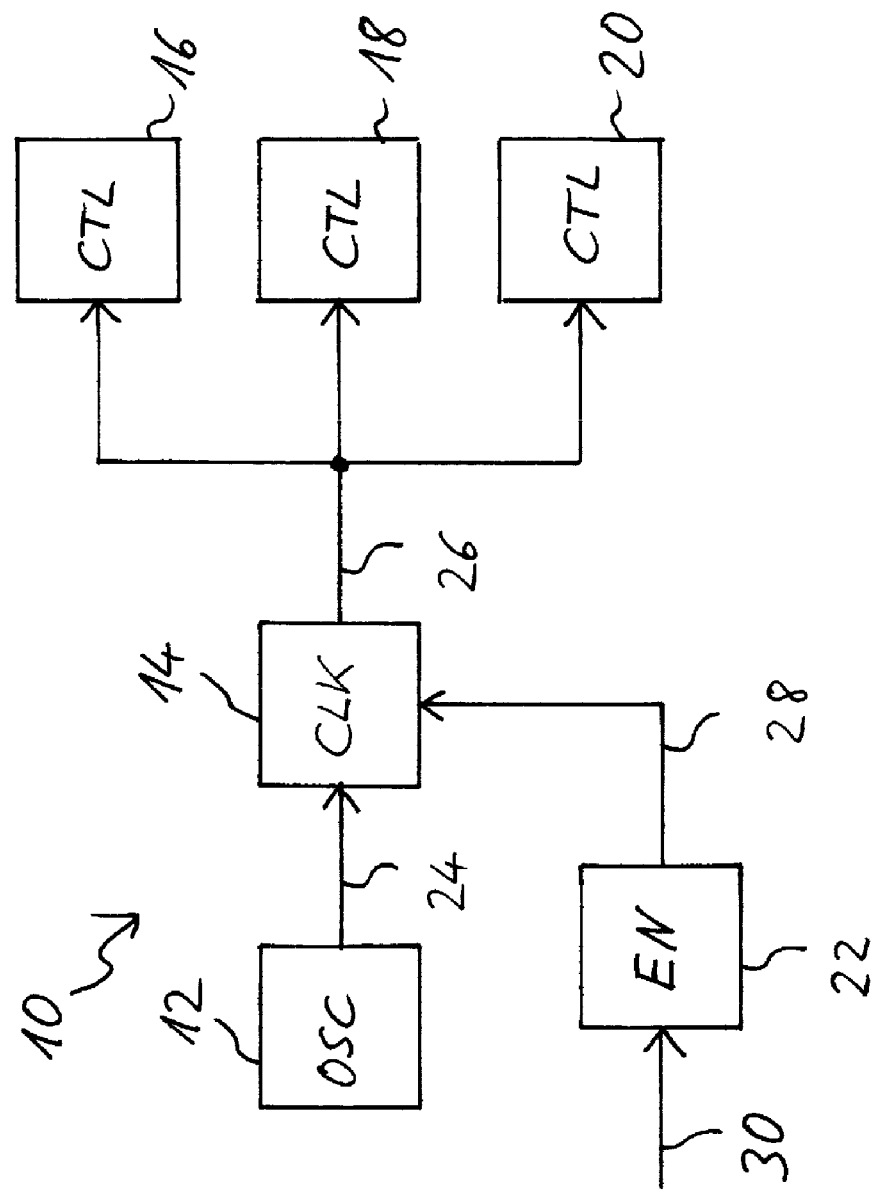
FIG. 1 schematically shows an example of an embodiment of an electronic device.

FIG. 1 schematically illustrates an example of an electronic device 10. The electronic device 10 may, for instance, be a microcontroller unit (MCU), e.g., a programmable microcontroller unit. The electronic device 10 may comprise, for example, a clock unit 14 and one or more processing units. In the shown example, the electronic device 10 comprises a first, second, and third processing unit 16, 18, and 20, respectively. The processing units 16, 18, 20 may each be connected to the clock unit 14. The clock unit 14 may be arranged to deliver an output clock signal 26. The processing units 16, 18, 20 may be clocked by the output clock signal 26. The processing units 16, 18, 20 may, for instance, be a control unit within a controller area network (CAN), a control unit within a FlexRay network, and some other control unit, respectively. Each of the processing units 16, 18, 20 may thus be arranged to communicate with other units or devices (not shown) which may be external to the device 10. The electronic device 10 may, for instance, be integrated in a motor vehicle, e.g., a motor car. The electronic device 10 may notably be a control unit for controlling an engine of the vehicle. In another example, the electronic device 10 may be integrated in a mechanical toy, amusement machine, e.g., a merry-go-round, power plant control system, driven tool, e.g., a drilling machine, or any other kind of technical system in which warranty claims may be a concern.

The electronic device 10 may further comprise an oscillator unit 12 for generating an input clock signal 24. The clock unit 14 may be arranged to generate the output clock signal 26 from the input clock signal 24. It is pointed out that this is only an example. In another example, the clock unit 14 may comprise an oscillator for generating its own clock signal. In yet another example, the electronic device 10 does not comprise the oscillator unit 12, and the clock unit 14 may be arranged to receive the input clock signal 24 from an external unit.

A clock rate of a clock signal may, for example, be defined as a number of triggering edges per second. Triggering edges may be either rising edges or falling edges, or both rising and falling edges. The clock rate may be defined equivalently as the inverse of the clock period. The clock period may be defined as, for instance, the time between a first rising edge and the next rising edge. An ideal clock signal is strictly periodic. Jitter may be defined as a deviation of perfect periodicity of the clock signal. When a rising edge or a falling edge of a clock signal is early or late, the clock signal is said to have jitter. Various definitions for quantifying and measuring jitter are known in the art.

The clock unit 14 may have a normal mode of operation. When the clock unit 14 is operating in the normal mode, the output clock signal 26 may have a low amount of jitter and a normal clock rate. This may ensure that the electronic device 10 may be used normally, i.e., for its intended purpose. As mentioned above, the intended purpose may, for instance, include controlling a mechanical device, e.g., an engine. More specifically, the output clock signal 26 having a low amount of jitter and a normal clock rate may allow the processing units which are clocked by the clock signal 26 (e.g., the processing units 16, 18, 20) to communicate with other devices of the system, e.g., via a CAN or FlexRay bus. For instance, the processing unit 16 (CAN controller) may communicate with other nodes of the CAN network in, e.g., a motor vehicle. The second processing unit 18 (FlexRay controller) may, for instance, communicate with other nodes of the FlexRay network. In this context, communicating may comprise receiving data, sending data, or both.

The clock unit 14 may further have a failure analysis mode. When the clock unit 14 is operating in the failure analysis mode, the output clock signal 26 may have a high amount of jitter or a reduced clock rate or both to impede normal use of the electronic device. In the failure analysis mode, the output clock signal 26 may thus differ substantially from the output clock signal 26 in the normal mode. More specifically, reducing the clock rate relative to the normal mode may slow down the processing units 16, 18, and 20 and thus prevent them from communicating correctly with associated devices. Reducing the clock rate may, however, not affect the sequence of logic operations performed by the processing units 16, 18, 20. In other words, the same sequence of operations may be performed in the failure analysis mode as in the normal mode, albeit slower. The electronic device 10 can thus be analyzed in the failure analysis mode, e.g., for the purpose of error identification. Reducing the clock rate of the output clock signal 26 may further facilitate the failure analysis. However, its main benefit may be to impede normal use of the electronic device 10, thereby reducing the risk that the device is returned to service.

A similar or even more severe effect may be achieved by introducing jitter to the output clock signal 26 in the failure analysis mode. Indeed, a sufficiently high level of jitter in the output clock signal 26 may prevent the one or more processing units clocked by the output clock signal 26 (e.g., the processing units 16, 18, and 20) from communicating with associated devices. However, compared to reducing the clock rate, adding jitter to the output clock signal 26 may be more effective for preventing an illegal reuse of the electronic device 10 because it may be more difficult to compensate. In fact, it is noted that a user who has illegally acquired the electronic device 10 with the clock unit 14 in the failure analysis mode might be tempted to replace the oscillator unit 12 by an oscillator unit having a higher frequency in order to generate an output clock signal 26 having a sufficiently high frequency. In contrast, modifying the electronic device 10 to remove the jitter from the output clock 26 in the failure analysis mode may be much more difficult.

The jitter may be deterministic or pseudorandom. Deterministic jitter may, for instance, comprise delaying rising edges or falling edges or both in accordance with, e.g., a lookup table. The lookup table may, for instance, prescribe a fixed delay for each edge of a finite sequence of edges. The finite sequences of edges may, for instance, comprise at least eight edges. The delay scheme indicated by, e.g., the lookup table may be applied periodically to generate periodic jitter. Pseudorandom jitter may be generated using a pseudorandom number generator and may be much more difficult and, in practice, impossible to work around.

The electronic device 10 may further comprise a disable unit 22. The disable unit 22 may be connected to the clock unit 14 and arranged to deactivate the normal mode and to activate the analysis mode in response to a disable signal 30. The disable signal 30 may, for instance, be a user signal, e.g., a user action such as closing a dedicated switch or applying a certain voltage at a dedicated input terminal. The user in this context may, for instance, be a technician charged with performing a failure analysis of the electronic device 10. The disable unit 22 may be further arranged to generate a control signal 28 for indicating the current operating mode, e.g., the normal mode or the failure analysis mode, to the clock unit 14.

The disable unit 22 may notably be arranged to deactivate the normal mode permanently in response to the disable signal 30. In other words, the electronic device 10 may be deprived of means for reactivating the normal mode. The user, e.g., the technician, may thus be enabled to deactivate the normal mode permanently and thus reduce a risk of dangerous, detrimental, or illegal reuse of the electronic device 10.

Figure 2:
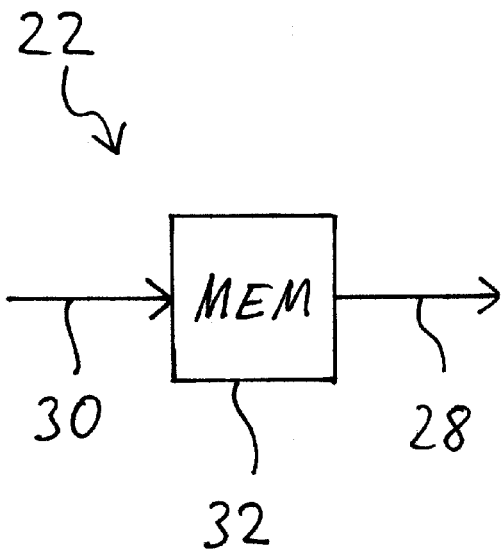
FIG. 2 schematically shows an example of an embodiment of a disable unit.

An example of an embodiment of the jitter control unit 22 is schematically shown in FIG. 2.

In this example, the disable unit 22 may comprise a non-volatile memory element 32. The memory element 32 may have first state for enabling the normal mode and a second state for enabling the failure analysis mode. The memory element 32 may notably be a binary element, i.e., an element having only two possible stable states. The memory element 32 may be semiconductor-based. The memory element 32 may, for instance, be a memory cell in, e.g., a flash memory. The memory element 32 may notably be one-time programmable (OTP). For instance, the electronic device 10 may be manufactured with the memory element 32 in the first state so that the normal mode of the clock unit 14 may be enabled. An irreversible transition from the first state to the second state may then be triggered by means of, e.g., the disable signal 30. The failure analysis mode of the clock unit 14 may thus be permanently enabled, and the normal mode may be permanently disabled. In another example, the memory element 32 may be a fuse. The first state may be an unblown state, and the second state may be a blown state of the fuse. The failure analysis mode may thus be activated and the normal mode deactivated by blowing the fuse 32.

Figure 3:
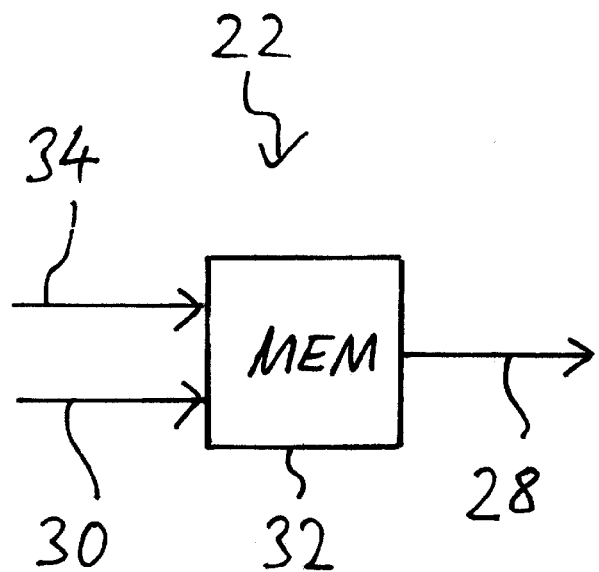
FIG. 3 schematically shows an example of an embodiment of a disable unit.

Another example of the disable unit 22 is schematically illustrated in FIG. 3. In this example, the memory element 32 may have associated with it an electronic key 34 for protecting it against unauthorized access. The key 34 may, for instance, be implemented by means of a secret code. The code may be equivalent to a character chain having a certain length. A longer length may make the key more secure. The memory element 32 may be arranged such that its state may not be changed unless the correct key 34 is used to unlock the memory element 32.

The clock unit 14 may thus be protected against unauthorized activation of the normal mode. The design described above in reference to FIG. 2 may render a reactivation of the normal mode virtually impossible. The same is true for the design described in reference to FIG. 3 if the key 34 is unknown or kept secret.

It is also noted that both designs (see FIGS. 2 and 3) may be robust against accidental enablement of the failure analysis mode. This can be important to prevent accidental deactivation of the normal mode during normal operation of the electronic device 10, e.g., while an engine controlled by the electronic device 10 is running.

Figure 4:
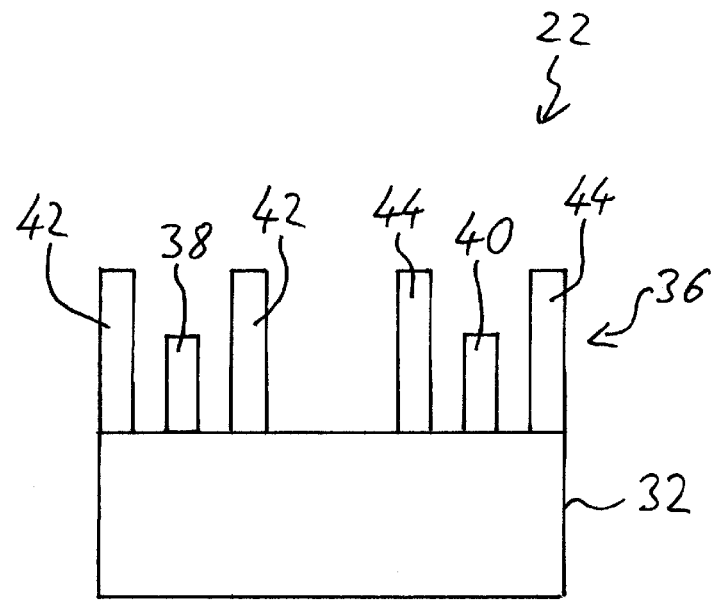
FIG. 4 schematically shows an example of an embodiment of a disable unit.

Referring now to FIG. 4, the disable unit 22 described above in reference to FIGS. 2 and 3 may have a dedicated input unit 36 for receiving the disable signal 30. The input unit 36 may be dedicated in the sense that it may be reserved for the sole purpose of deactivating the normal mode and activating the failure analysis mode. A risk of accidental deactivation of the normal mode may thus be reduced. The input unit 36 may, for instance, be arranged such that the state of the memory element 32, e.g., a flag in a flash memory, can only be changed via software when a dedicated external pin is asserted. In the shown example, the input unit 36 may comprise, e.g., a pair of pins 38, 40. They may be connected to the memory cell 32 such that applying a suitable voltage across the pins 38 and 40 may trigger a state transition from the first state to the second state of the memory element 32. Each of the pins 38 and 40 may be protected by a shield, e.g., a shield surrounding or partly surrounding the respective pin 38 and 40. The shields 42 and 44 may, for instance, be made of an electrically non-conductive material, e.g., plastic. Each pin 38 and 40 may be retracted relative to its respective shield 42 and 44. A risk of accidental application of a voltage across the pins 38 and 40 may thus be further reduced.

Figure 5:
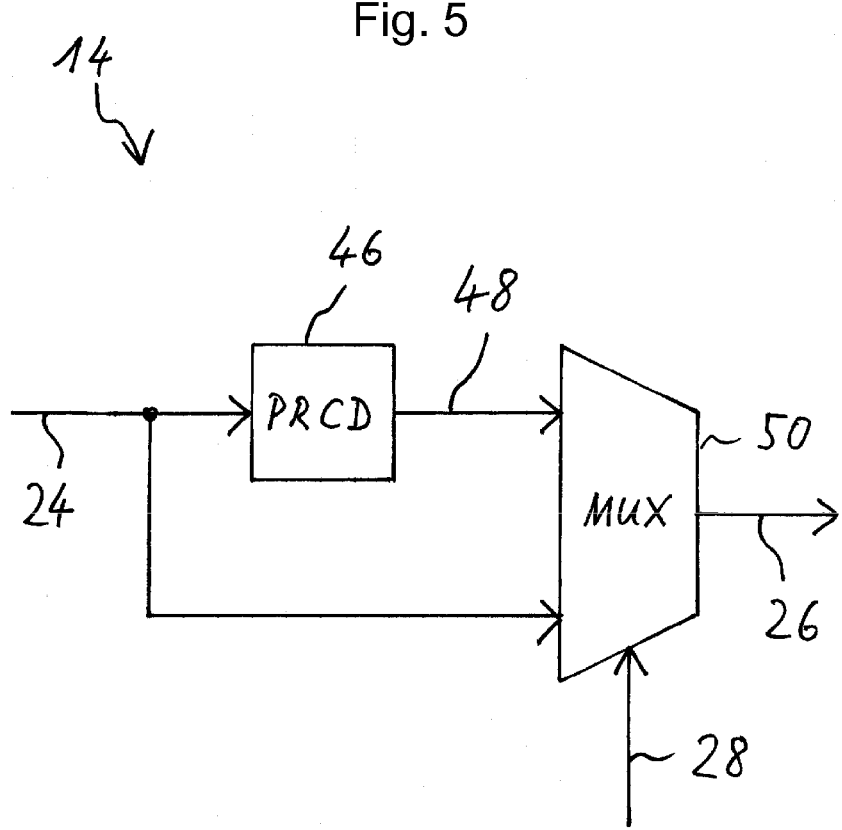
FIG. 5 schematically shows an example of an embodiment of a clock unit.

FIG. 5 schematically shows an example of an embodiment of the clock unit 14. In this example, the clock unit 14 comprises a clock conversion unit 46 for generating a modified clock signal 48 from the input clock signal 24. The clock unit 14 may further comprise a multiplexer 50 for delivering either the input clock signal 24 or the modified clock signal 48 in dependence on, e.g., the control signal 28 (also referred to herein as the multiplexer select signal). The output clock signal 26 may thus be the clock input signal 24 when the clock unit 14 is in the normal mode and the modified clock signal 48 when the clock unit 14 is in the failure analysis mode.

The signal conversion unit 46 may notably be a pseudo-random clock divider (PROD) and may therefore also be referred to herein as the PROD 46. The PROD 46 may be arranged to add jitter to the input clock signal 24 so as to prevent communication for, e.g., the processing units in the electronic device 10, e.g., the processing units 16, 18, 20. The PROD 46 may, for instance, comprise a shift register, e.g., a linear feedback shift register and a clock divider. The clock divider may be arranged to divide the input clock signal 24 by a fixed value of, e.g., sixteen. The clock divider may thus increase the clock period by a factor of, e.g., sixteen. The linear feedback shift register may be used to generate one or more pseudorandom numbers. This number, or these numbers, may be used to select the instant at which the next edge (i.e., transition) of the output clock signal 48 should occur.

For instance, considering the example of a divide by sixteen, a non-jittering clock divider might produce an output clock signal having a transition (i.e. an edge) every eight input clock cycles. In contrast, the PRCD 46 may have an output clock transition randomly or pseudo-randomly aligned with one of eight successive input clock cycles. This random effect may repeat every eight input clock cycles. In other words, the positive (rising) edge of the divided clock may occur randomly or pseudo-randomly on any one of eight successive positive edges of the input clock signal. Similarly, the negative (falling) edge of the divided clock may occur randomly or pseudo-randomly on any one of the next eight successive positive edges of the input clock signal.

It is noted that many existing micro-controller units (MCUs) already employ clock dividers, e.g., in order to generate various frequencies for various protocols. These existing dividers can be modified slightly in order to inject jitter to the output clock signal or to reduce the output clock rate. Implementation of the failure analysis mode may therefore be possible with a very small additional area overhead.

Figure 6:
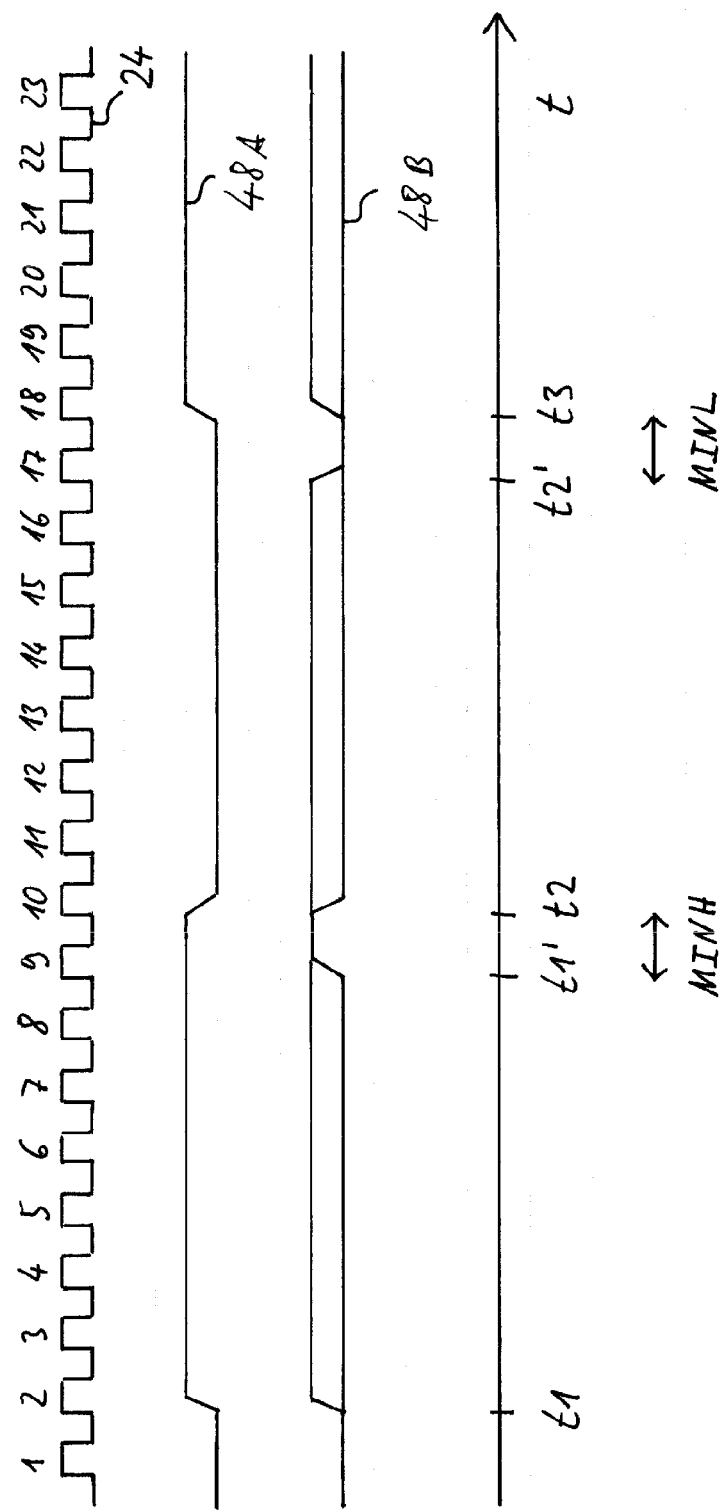
FIG. 6 shows a schematic plot of an example of an input clock signal, a first example of a modified clock signal, and a second example of a modified clock signal.

Operation of an example of the PROD 46 is further described in reference to FIG. 6. The plot in FIG. 6 shows an example of the input clock signal 24, a first example 48A of the modified clock signal 48, and a second example 48B of the modified clock signal 48. An amplitude, e.g., a voltage level, is plotted for each of these signals as a function of time "t". The first example signal 48A may for instance be the input clock signal 24 with a clock rate divided by, e.g., sixteen, and with no jitter added. The second example signal 48B may further have jitter added to it.

The input clock signal 24 may comprise a periodic succession of pulses (numbered 1 to 23 in the figure). The amplitude of the input clock signal 24 may be high during a high time and low during a low time. Each cycle may comprise a high time and a low time. A transition from low to high may be referred to as a rising edge. A transition from high to low may be referred to as a falling edge. The input clock signal 24 may thus be considered a periodic succession of rising and falling edges.

With the multiplexer select signal 28 in the appropriate state, the modified clock signal 48A and thus the output clock signal 26 may be generated from the input clock signal 24 by means of, e.g., a clock divider, e.g., integrated in the conversion unit 46 shown in FIG. 5. In this example, the clock divider may increase the clock period by a factor of, e.g., sixteen. In other words, it may divide the clock rate by a factor of, e.g., sixteen. In this example, every $16^{th}$ rising edge of the input clock signal 24 may trigger a rising edge of the modified clock signal 48a. In the example shown, the rising edge associated with pulse number 2 may thus trigger a rising edge of the modified clock signal 48a at time t1. Similarly, the rising edge associated with pulse number 18 may trigger a rising edge of the modified clock signal 48a at time t3. Furthermore, a falling edge in the modified clock signal 48a may be triggered at some intermediate time between t1 and t3. In this example, the falling edge between time t1 and t3 may be triggered by the rising edge of pulse number 10 at time t2, which may be the midpoint of the interval t1 to t3. By using the modified clock signal 48A as the output clock signal 26 in the failure analysis mode, the processing units of the electronic device 10 may be slowed so as to disable the electronic device 10 for applications of practical interest. An analysis of its operation may yet still be possible.

Depending on the application in question, it may be beneficial to reduce the clock rate more severely. For example, in case of a device 10 communicating with a CAN or FlexRay system, a division by sixteen may be insufficient to make the device 10 unusable. In fact, to make CAN work at its maximum frequency of, e.g., 1 megabaud, a clock of, e.g., 5 MHz may be required. The input clock may be, e.g., 400 MHz, so a divide of, e.g., eighty may be required for normal operation anyway. For a straight divide to be effective, the input clock signal 24 may for instance be divided by 512, 1024, 2048, or higher, to generate the output clock signal 26 in the failure analysis mode.

On the other hand, division by a smaller number, e.g., sixteen, may at least have the benefit of marking the device as a failed. When a device marked in this manner is found in a vehicle, this may indicate that the device was installed illegally.

The second example 48B of the modified clock signal 48 may differ from the first example 48A in that its rising or falling edges or both rising and falling edges may be generated at random or pseudorandom instants in response to a triggering edge of the input clock signal 24. For instance, any triggering edge of the input clock signal 24, e.g., the rising edges of every N-th pulse (e.g., N=16), may trigger an edge in the modified clock signal 48B with a random or pseudorandom delay. The delay may be determined, for instance, by means of a pseudorandom number generator (not shown). In the example shown, the rising edge of pulse number 2 of the input clock signal 24 may, for instance, trigger a rising edge of the modified clock signal 48B at a time t1'. The instant t1' may be delayed relative to the time t1 of the triggering edge by a delay t1'-t1 defined by the pseudorandom generator. The maximum possible delay t1'-t1 may, however, be restricted to, e.g., an interval t1 to t2 minus MINH, where t2 is the time of the next triggering edge of the input clock signal 24 and MINH is a minimum high time. In other words, it may be ensured that there is a certain minimum time lapse between two successive edges in the modified clock signal 48B. The shown position of time t1' may thus be the latest possible position of the rising edge. It is pointed out that t1' may be a random time somewhere between t1 and t2—MINH. t1' may notably coincide with the rising edge of one of the pulses number 2 to number 9, as this can make it more practical to implement in logic. Alternatively, t1' may be anywhere between t1 and t2-MINH.

The rising edge of pulse number 10 in the input clock signal 24 may similarly trigger a falling edge of the modified clock signal 48B with a random or pseudorandom delay. For instance, the falling edge may be generated at a time t2' between time t2 of the triggering edge and time t3 of the next triggering edge. The maximum possible delay between time t2' of the falling edge of the modified clock signal 48B and time t2 of the triggering edge of the input clock signal 24 may be limited such that there is a minimum time lapse between the falling edge of the modified clock signal 48 at time t2' and the next triggering edge (e.g., at time t3) of the input clock signal 24.

With the multiplexer control signal 28 in the appropriate state, it may thus be ensured that the modified clock signal 48B and, hence, the output clock signal 26 in the failure analysis mode have a minimum high time MINH and a minimum low time MINL. The minimum high time MINH and the minimum low time MINL may notably be equal to or greater than the period of the input clock signal 24. It may thus be ensured that the processing units 16, 18, and 20 may operate correctly (albeit slower) when clocked by the modified clock signal 48B. This may be important for performing a failure analysis of the electronic device 10 in the failure analysis mode.

In the normal mode, the output clock signal 26 may thus have a low amount of jitter and a normal clock rate to enable normal use of the electronic device 10. In the failure analysis mode, however, the output clock signal 26 may have a high amount of jitter or a reduced clock rate, or both (as described above in reference to the second example 48B of the modified output clock signal 48), to impede normal use of the electronic device 10.

Figure 7:
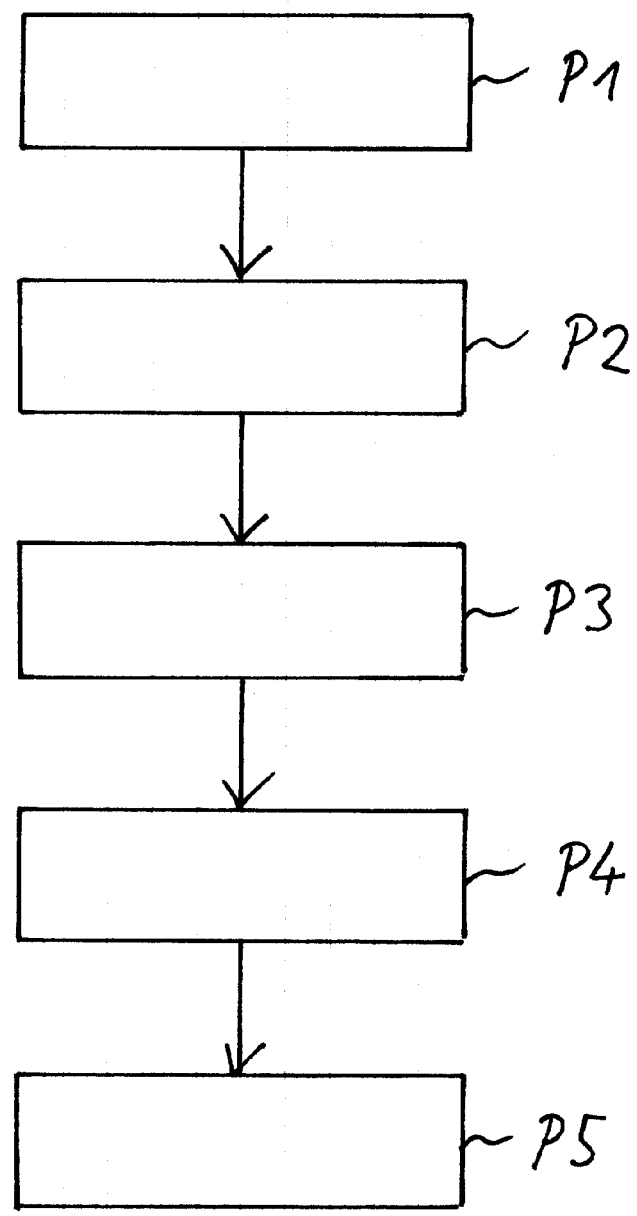
FIG. 7 shows a flowchart illustrating an example of a method of protecting an electronic device against unauthorized use.

An example of a process flow relating to an electronic device 10 as described above is illustrated schematically by the flowchart in FIG. 7. The device 10 may be manufactured such that its clock unit 14 is in the normal mode when the device is first put into operation. The device 10 may thus be operated with the clock unit 14 in the normal mode (block P1). The output clock signal 26 may have a low amount of jitter and a normal clock rate so that the device can be operated normally in its environment, e.g., a motor vehicle. Next, a failure of the electronic device 10 may be observed or suspected (block P2). Such failure may, for instance, be deduced from an unexpected behavior of devices communicating with or controlled by the electronic device 10. The device 10 may then be sent back to, e.g., the manufacturer or to a service center. A technician may actuate the disable unit 22 to disable the normal mode and to enable the failure analysis mode (block P3). The device 10 may thus be protected against further use. Furthermore, the device 10 may be subjected to a failure analysis (block P4). The failure analysis may involve operating the electronic device 10 in the failure analysis mode, in which the output clock signal 26 has a high amount of jitter or a reduced clock rate or both. Finally, the electronic device 10 may be repaired, recycled, or disposed of. Depending on whether the transition from the normal mode to the failure analysis mode is reversible or not, the manufacturer may reactivate the normal mode if he has concluded that the electronic device 10 can be safely operated in the normal mode. To this end, the manufacturer may overcome the protection mechanism that may protect the clock unit 14 against unauthorized reactivation of the normal mode.

In summary, the failure analysis mode described herein may render the electronic device inconvenient or impossible to use in its normal working environment, e.g., in a motor vehicle, yet allow a full failure analysis.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the oscillator unit 12 may be external to the device 10. The devices connected to the processing units 16, 18, and 20 and communicating with them, e.g., using different communication protocols, may be integrated in the device 10. The disable unit 22 may be integrated in the clock unit 14.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, units 12, 14, 16, 18, and 20 may be implemented as a single integrated circuit. Alternatively, the examples may be implemented as any number of separate integrated circuits or separate devices interconnected with each other in a suitable manner. For example, units 12, 14, 16, 18, and 20 may be implemented as separate devices.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An electronic device comprising a clock unit and a processing unit connected to said clock unit, said clock unit arranged to generate an output clock signal, said processing unit arranged to be clocked by said output clock signal, said clock unit having:
   a normal mode in which said output clock signal has a low amount of jitter and a normal clock rate to enable normal use of said electronic device and
   a failure analysis mode in which said output clock signal has a high amount of jitter or a reduced clock rate, or a high amount of jitter combined with a reduced clock rate, to impede said normal use;
   wherein said clock unit is protected against unauthorized re-activation of said normal mode, and said output clock signal has a shortest possible high time and a shortest possible low time which are not shorter in said analysis mode than in said normal mode.

2. The electronic device of claim 1, further comprising a disable unit connected to said clock unit and arranged to deactivate said normal mode and activate said analysis mode in response to a disable signal.

3. The electronic device of claim 2, wherein said disable unit is arranged to deactivate said normal mode permanently in response to said disable signal.

4. The electronic device of claim 3, wherein said disable unit comprises a dedicated input unit for receiving said disable signal.

5. The electronic device of claim 2, wherein said disable unit comprises a non-volatile memory element having:
a first state for enabling said normal mode and
a second state for enabling said analysis mode.

6. The electronic device of claim 5, wherein said memory element is one-time programmable.

7. The electronic device of claim 5, wherein said memory element is lockable by means of an electronic key.

8. The electronic device of claim 1, wherein said clock unit is arranged to generate edges of said output clock signal periodically when in said normal mode and randomly or pseudo-randomly when in said analysis mode.

9. The electronic device of claim 1, wherein said clock unit is arranged in both said normal mode and said analysis mode to generate said output clock signal from an input clock signal having a low amount of jitter.

10. The electronic device of claim 9, wherein said clock unit comprises a pseudo-random clock divider arranged to generate said output clock signal from said input clock signal when said clock unit is in said analysis mode.

11. The electronic device of claim 9, wherein said clock unit is arranged to deliver said input clock signal as said output clock signal when said clock unit is in said normal mode.

12. A method of protecting an electronic device against unauthorized use,
said method comprising:
generating an output clock signal in a clock unit, wherein the clock unit is included in said electronic device;
clocking a processing unit by said output clock signal, wherein said processing unit is included in said electronic device;
operating said clock unit in a normal mode in which an input clock signal having a normal clock rate and a low amount of jitter is delivered as said output clock signal to enable normal use of said electronic device;
activating a failure analysis mode in which said output clock signal has a reduced clock rate or a high amount of jitter, or a high amount of jitter combined with a reduced clock rate, to impede said normal use; and
protecting said clock unit against unauthorized re-activation of said normal mode.

13. The method of claim 12, further comprising a failure analysis of said electronic device.

* * * * *